Patented Jan. 6, 1942

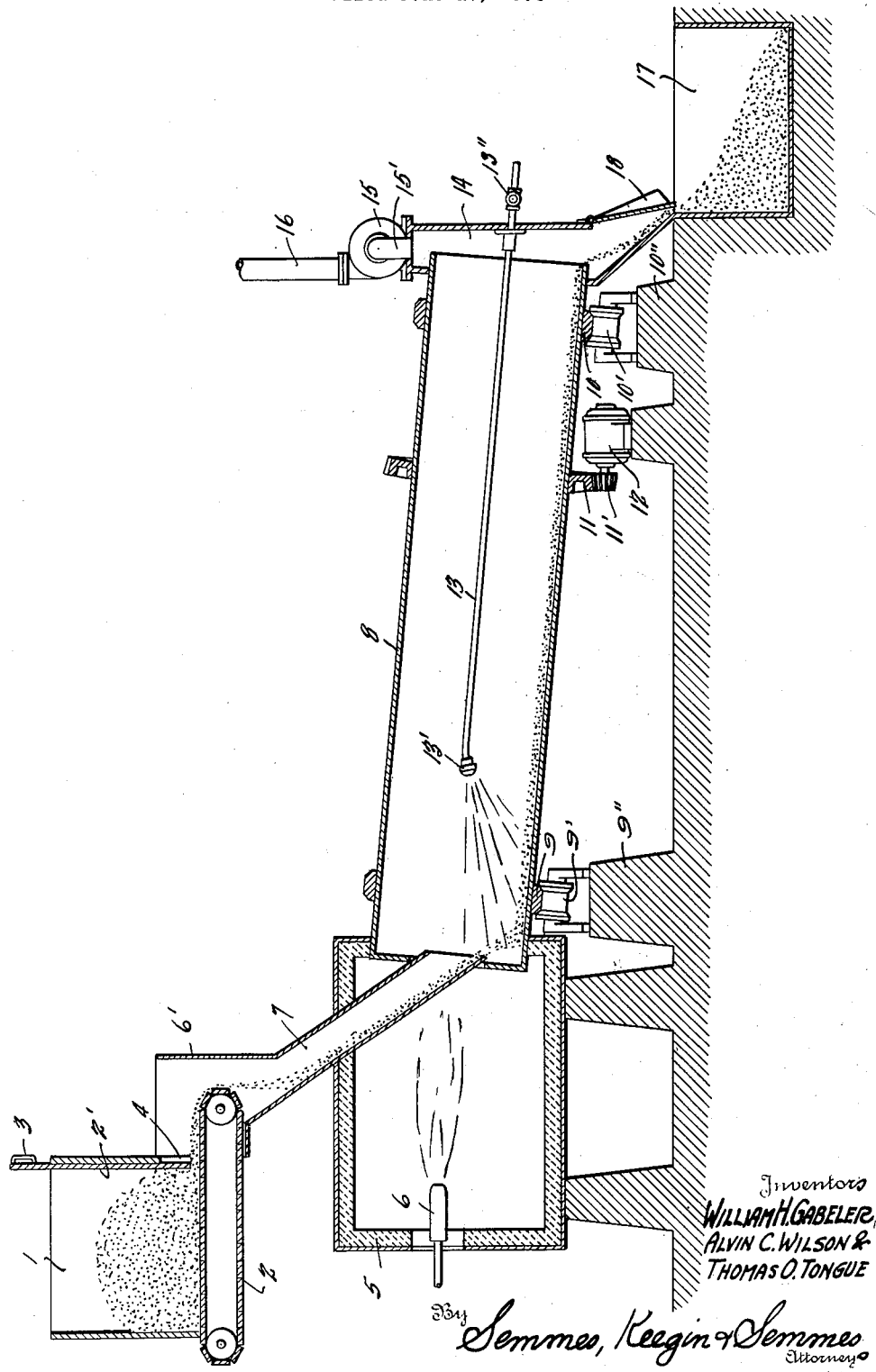

2,268,816

UNITED STATES PATENT OFFICE 2,268,816

APPARATUS FOR PREPARING PHOSPHATIC FERTILIZERS

William H. Gabeler, Alvin C. Wilson, and Thomas O. Tongue, Baltimore, Md., assignors to The Davison Chemical Corporation, Baltimore, Md.

Application June 17, 1938, Serial No. 214,327

5 Claims. (Cl. 18—1)

Our invention relates to fertilizers, and more particularly to products containing phosphatic materials, and apparatuses and processes for making the same.

Heretofore in the ordinary den process of manufacturing superphosphates the time and labor necessary to obtain the final desired product has been excessive. In the ordinary den process the rock and acid, after initial reaction, are dumped into a den and from there moved from pile to pile for curing of the material. During this curing time the percentage of available $P_2O_5$ was raised and free phosphoric acid was reduced. Often the final product was not in proper condition, resulting in bag rot and other undesirable characteristics.

Under the old process the curing superphosphate became caked and it was necessary to mill it in order to obtain a product which would be commercially desirable.

The final product obtained by this method of manufacture consisted largely of fines, and among the disadvantages of the product was that it was difficult to obtain even distribution of the material on the land. The material was not free running in the machines for distributing the material on the land. Ordinarily speaking, den superphosphate whether made by the usual den method or by mechanical dens, had a high angle of repose. In fact, the angle of repose of any particular batch of superphosphate was indeterminate except by test with that particular batch. This made it exceedingly difficult to determine the exact operating conditions for distribution of the phosphate on the soil.

An object of the present invention is to devise a process which is economical and efficient, and which requires less handling of the product, thus saving cost.

A further object of the invention is to produce a product superior to the usual den or mechanical den processes. Our product is granular and has a high available $P_2O_5$.

Yet another object of the invention is to devise an apparatus which is simple in form, easy to operate, repair and replace. In general the invention comprises agglomerating fresh den superphosphate or partially cured den superphosphate in an agglomerating step, preventing coalescence of the particles and subjecting them to a drying step to obtain granular superphosphate. There may be mixed with the superphosphate undergoing this process nitrogen or potassium bearing substances, or both, to obtain a complete fertilizer. The amount of water which is necessary to achieve the desirable agglomeration of the particles depends on the nature of the material being treated. A partially cured superphosphate will require more water in the agglomerating step than will a fresh den superphosphate. The range of moisture content of the initial material prior to the agglomeration step can be within wide limits. The minimum final moisture content from the drying step may be lower, but should not exceed a certain minimum. The mixed superphosphate fertilizer may have a lower final moisture content than the straight superphosphate without danger of reversion of the $P_2O_5$.

The desirable granular product is one having hard nodular particles of substantially uniform size. Where large particles of the final material are obtained, these may be crushed to reduce them to the desired size. The particles of the finished material are in general globoid in shape, nodular, encrusted and indurated. These separate or discrete particles are free flowing and will not tend to coalesce during storage. There is a certain amount of curing that may occur in the product from the drier, but the particles from the drier are apparently hard and dry and will not coalesce, and the material is ready for bagging for shipment immediately after the drying step. This feature of being able to bag the product immediately after the drying step enables considerable economies to be effected in the process, since expensive handling and re-working is unnecessary.

Where nitrogenous and potassium containing materials are added to make a complete fertilizer, we may employ ammonium sulphate to furnish the $N_2$ and potassium chloride to furnish the $K_2O$ constituent.

The single figure of the drawing diagrammatically illustrates the preferred form of apparatus which we may employ to carry out the process. It is to be noted that the apparatus is so arranged that the nodulizing and drying all occur in different sections of the same rotating cylinder. Other forms of apparatus can be used, but the form shown is a desirable embodiment of an apparatus for carrying out either the manufacture of mixed fertilizer or of superphosphate.

Referring to the drawing, we have shown a hopper I which contains den superphosphate. This den superphosphate may be fresh or partially cured. The bottom of the hopper I comprises a slat conveyor 2 that is used as a feeder. An adjustable gate 2' is provided with a handle 3, by means of which the depth of the layer of superphosphate on the conveyor 4 is regulated. This makes it possible to adjust the rate of feed of the superphosphate without changing the speed of the slat conveyor 2.

Superphosphate is delivered to the bin I by means of a bucket elevator or a clam shell crane bucket, or some other type of conveyor mechanism, not shown. Instead of using straight den superphosphate, mixtures of superphosphate and other fertilizing materials containing nitrogen and potash values may of course be used, such as ammonium sulphate, to furnish the $N_2$ or potassium chloride to furnish the $K_2O$ ingredient. We have shown a refractory lined combustion furnace 5 which is provided with an oil burner 6. The superphosphate containing material is fed from the conveyor 2 to a hopper 6' and a feed chute 7 which delivers the material to a rotary drier 8. The rotary drier 8 is rotatably supported on rings 9 and 10 and rollers 9' and 10' respectively, which are supported by supports 9" and 10". This construction is conventional. In order to rotate the rotary drier 8, we have shown a ring gear 11 driven by means of a pinion 11' rotated by a suitable motor, such as a conventional electric motor, 12, shown in the drawing. It is to be understood that in ordinary practice there is a gearing between the motor shaft in the pinion 11', but for simplicity in illustration and description such customary construction is not shown.

A pipe 13 extends from the discharge end of the rotary drier 8 towards the feed end of the drier. The pipe 13 may be provided with a nozzle 13' which discharges a spray of water or aqueous medium on the material as it enters the drier. It is to be understood that if the water content of the material is sufficiently high it may be unnecessary to add any aqueous medium during the agglomeration step. The amount of water added can be regulated by valve 13".

At the discharge end of the rotary drier is a discharge breeching 14 made of customary steel plate. An exhaust fan 15 sucks gases through a duct 15' and discharges them through an exit pipe 16 into the atmosphere.

Dried granular material from the discharge end of the drier 8 is delivered to a receiving pit 17. From this pit 17 the material may be conveyed by a crane bucket or any other suitable conveyor to a storage pile. A swinging door 18 on the breeching 14 is suspended in such a manner that it will allow the material from the drier to discharge without hindrance into the receiving pit 17, but at the same time any undue entrance of air is prevented at this point so that a proper amount of suction can be maintained on the entire system.

As mentioned before, pipe 13 delivers a spray of water or aqueous medium upon the material entering the dryer. This scheme is particularly adapted to work up materials in aqueous solutions containing ingredients of fertilizer value. As an example we may cite distillery waste from alcohol manufactured from molasses, which we will call molasses waste.

To obtain the agglomerated form the material must be agitated with a certain initial moisture content, the minimum of which will depend upon whether straight superphosphate is handled, or mixtures of superphosphates and other materials. The age of the superphosphate will also have a definite effect upon the minimum initial moisture content required.

The fact that the conditioning and drying take place in the same rotating cylinder saves handling and also effects definite economies in apparatus.

The minimum initial moisture content of fresh superphosphate may be as low as 9%, depending upon operating conditions.

The maximum initial moisture content may be as high as 30% when it is desired to work up substantial quantities of aqueous solution in the process.

It will be understood that although ordinarily it is necessary to supply a spray of aqueous medium upon the material entering the drier to cause immediate agglomeration of the material, it is also possible to supply the material moist enough so that additional moisture supply is unnecessary.

Having described the principles of the process, as well as an example of an apparatus for carrying out the process, we will now give some specific examples.

Cured superphosphate of the following composition was fed into the drier.

| | Per cent |
|---|---|
| Moisture | 9.78 |
| Total $P_2O_5$ | 18.75 |
| Insol $P_2O_5$ | 0.44 |
| Available $P_2O_5$ | 18.31 |

Molasses waste containing 45% of water and 4.75% of potash was sprayed upon the superphosphate entering the drier in approximately the following ratio:

| | Pounds |
|---|---|
| Molasses waste | 1140 |
| Superphosphate | 860 |

The granulated product from the drier analyzed as follows:

| | Per cent |
|---|---|
| Moisture | 2.10 |
| Total $P_2O_5$ | 13.00 |
| Insol $P_2O_5$ | .84 |
| Available $P_2O_5$ | 12.44 |
| $K_2O$ | 5.09 |

With a somewhat higher final moisture content the granular product analyzed:

| | Per cent |
|---|---|
| Moisture | 4.30 |
| Total $P_2O_5$ | 14.03 |
| Insol $P_2O_5$ | .84 |
| Available $P_2O_5$ | 13.19 |
| $K_2O$ | 3.60 |

The initial moisture content of the agglomerated material in the upper end of the drier was about 30% in the above cases.

As mentioned before, freshly prepared den superphosphate by itself requires the minimum amount of initial moisture. As an example of this we will give the following:

Fresh den superphosphate rasped direct from the den was used and it analyzed as follows:

| | Per cent |
|---|---|
| Moisture | 9.52 |
| Total $P_2O_5$ | 19.25 |
| Insol $P_2O_5$ | .90 |
| Available $P_2O_5$ | 18.35 |

This material was fed into an 8" dia. direct fired countercurrent rotary drier. The material discharged as hard granular about the size of small shot. This granular superphosphate had the following composition:

| | Per cent |
|---|---|
| Moisture | 4.78 |
| Total $P_2O_5$ | 21.83 |
| Insol $P_2O_5$ | 1.14 |
| Available $P_2O_5$ | 20.69 |

The material made by any of these methods consists of hard dry granules. In general the material has a tensile strength greater than den superphosphate, and a crushing strength when fully cured of several times the crushing strength of superphosphate. The granular particles are porous, discrete nodular particles which have encrusted surfaces. The particles are in general globoid in shape and may be properly described as irdurated.

While we have shown a particular form of apparatus and given some particular examples of the process, it is to be understood that we are to be limited only by the scope of the appended claims and the showing of the prior art.

We claim:

1. An apparatus for producing granular phosphatic fertilizer material comprising a combined agglomerating and drying rotatable drum said drum being closed to the atmosphere, means to feed phosphatic material into the drum, a source of heat means mounted adjacent the feed end of the drum and exteriorly thereof for supplying hot gases thereto to heat the drum means for causing said hot gases to flow through said drum concurrently with said phosphatic material, and a spray mounted within the drum between said feeding means and said means for causing the flow of hot gases to add moisture to the phosphatic material, said spray extending to a point adjacent to the feed end of the rotatable drum whereby said phosphatic material is agglomerated and dried while passing in a direction concurrent to the heating gases and in the absence of substantial amounts of air.

2. An apparatus for producing granular phosphatic fertilizer material comprising a combined agglomerating and drying rotatable drum which is closed to the atmosphere and whose axis is slanted to the horizontal, means adjacent the high end of the drum to feed phosphatic material therein, a source of heat mounted at the high end of the drum and exteriorly thereof for supplying hot gases thereto, means for causing said hot gases to flow through said drum concurrently with said phosphatic material, and a spray extending from the low end of the drum to a point adjacent to the high end thereof and between said feeding means and said means for causing the flow of hot gases for adding moisture to the phosphatic material whereby said phosphatic material is agglomerated and dried while passing in a direction concurrent to the heating gases and in the absence of substantial amounts of air.

3. An apparatus for producing granular phosphatic fertilizer material comprising a combined agglomerating and drying rotatable drum said drum being closed to the atmosphere, a source of heat at the feed end of the drum mounted exteriorly thereof for supplying hot gases thereto to heat the drum, means to feed phosphatic material into the drum means for causing said hot gases to flow through said drum concurrently with said phosphatic material, and spray means within the drum extending from the discharge end thereof to a point adjacent to the feed end and between said feeding means and said means for causing the flow of hot gases to dampen the phosphatic material in the drum whereby said phosphatic material is agglomerated and dried while passing in a direction concurrent to the heating gases and in the absence of substantial amounts of air.

4. An apparatus for producing granular phosphatic fertilizer material comprising a combined agglomerating and drying rotatable drum said drum being closed to the atmosphere, a source of heat at the feed end of the drum mounted exteriorly thereof for supplying hot gases thereto to heat the drum, means to feed phosphatic material into the drum, spray means extending from the discharge end of the drum to a point adjacent to the feed end thereof for adding moisture to the material, and a suction blower at the discharge end of the drum to exhaust gases therefrom and for causing said hot gases to flow through said drum concurrently with said phosphatic material, said spray means being mounted between said feeding means and said suction blower, whereby said phosphatic material is agglomerated and dried while passing in a direction concurrent to the heating gases and in the absense of substantial amounts of air.

5. In an apparatus for producing granular phosphatic fertilizer material, a combined agglomerating and drying rotatable drum said drum being closed to the atmosphere at its inlet end, a burner at the feed end and mounted exteriorly thereof adapted to supply hot gases to said drum to heat the drum, means to feed the material into the drum, a spray extending from the discharge end of the drum to a point adjacent to the feed end for adding moisture to the material, a suction fan at the discharge end of the drum for exhausting gases therefrom and for causing said hot gases to flow through said drum concurrently with said phosphatic material, said spray being mounted between said feeding means and said suction blower, and means associated with the discharge end for preventing the entrance of air at such end whereby said phosphatic material is agglomerated and dried while passing in a direction concurrent to the heating gases and in the absence of substantial amounts of air.

WILLIAM H. GABELER.
ALVIN C. WILSON.
THOMAS O. TONGUE.